United States Patent [19]

Raleigh

[11] Patent Number: 4,928,396
[45] Date of Patent: May 29, 1990

[54] COORDINATE MEASURING MACHINE WITH IMPROVED CARRIAGE DRIVE SYSTEM

[75] Inventor: Freddie L. Raleigh, Centerville, Ohio

[73] Assignee: The Warner & Swasey Company, Cleveland, Ohio

[21] Appl. No.: 320,189

[22] Filed: Mar. 7, 1989

[51] Int. Cl.⁵ .................. G01B 7/03; G01B 5/03
[52] U.S. Cl. ............................. 33/503; 33/1 M
[58] Field of Search ............ 33/1 M, 503, 504, 505, 33/23.03; 74/89.2, 89.21, 89.22

[56] References Cited

U.S. PATENT DOCUMENTS

| | | |
|---|---|---|
| 3,241,243 | 3/1966 | Speer . |
| 3,529,481 | 9/1970 | Budzyn . |
| 3,850,043 | 11/1974 | Tarbox ........................... 74/89.2 |
| 4,327,596 | 5/1982 | Simon ............................ 74/89.2 |
| 4,466,195 | 8/1984 | Herzog ........................... 33/503 |
| 4,524,520 | 6/1985 | Levy .............................. 33/1 M |
| 4,621,430 | 11/1986 | Lenz . |
| 4,621,926 | 11/1986 | Merry et al. . |
| 4,651,426 | 3/1987 | Band et al. ...................... 33/503 |
| 4,682,418 | 7/1987 | Tuss et al. ...................... 33/503 |
| 4,753,119 | 6/1988 | Küspert .......................... 74/89.21 |

Primary Examiner—William A. Cuchlinski, Jr.
Assistant Examiner—Christopher W. Fulton
Attorney, Agent, or Firm—John R. Benefiel; Raymond J. Eifler

[57] ABSTRACT

A coordinate measuring machine (10) having an improved carriage drive system including a flexible toothed belt (89) mounted on a rigid spar member (88) to be stretched along the carriage (X) axis. The spar member (88) absorbs the tension loading of the stretched flexible belt (89), while the connection (198, 152) of the spar member (88) to the base (12) precludes stressing of the machine (10) by the belt tension or by thermal stresses. A drive package (118) is mounted to one end of the carriage (40) and includes a toothed drum (126) engaging the flexible belt (89) so that upon being rotated by a drive motor (120) acting through a double reduction pulley system (254, 258, 260, 268, 272, 274) to rotate the toothed drum (126) and cause the carriage (40) to be driven along the ways (32, 34). Flexures (86a, 86b) mounting the belt (89) accommodate side to side movement as the carriage (40) is driven along the axis while being rigid to the tension exerted by the belt (89).

10 Claims, 9 Drawing Sheets

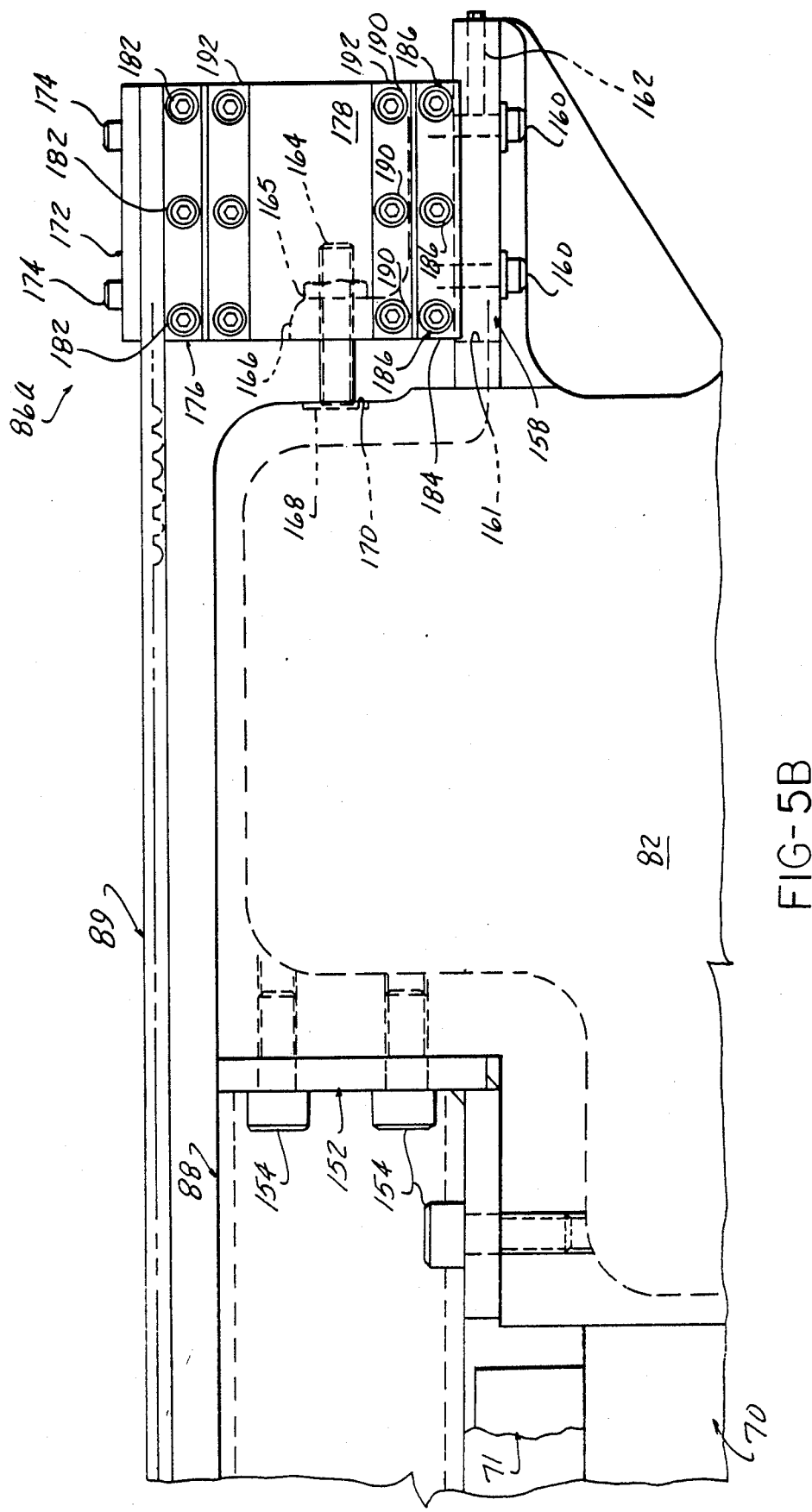

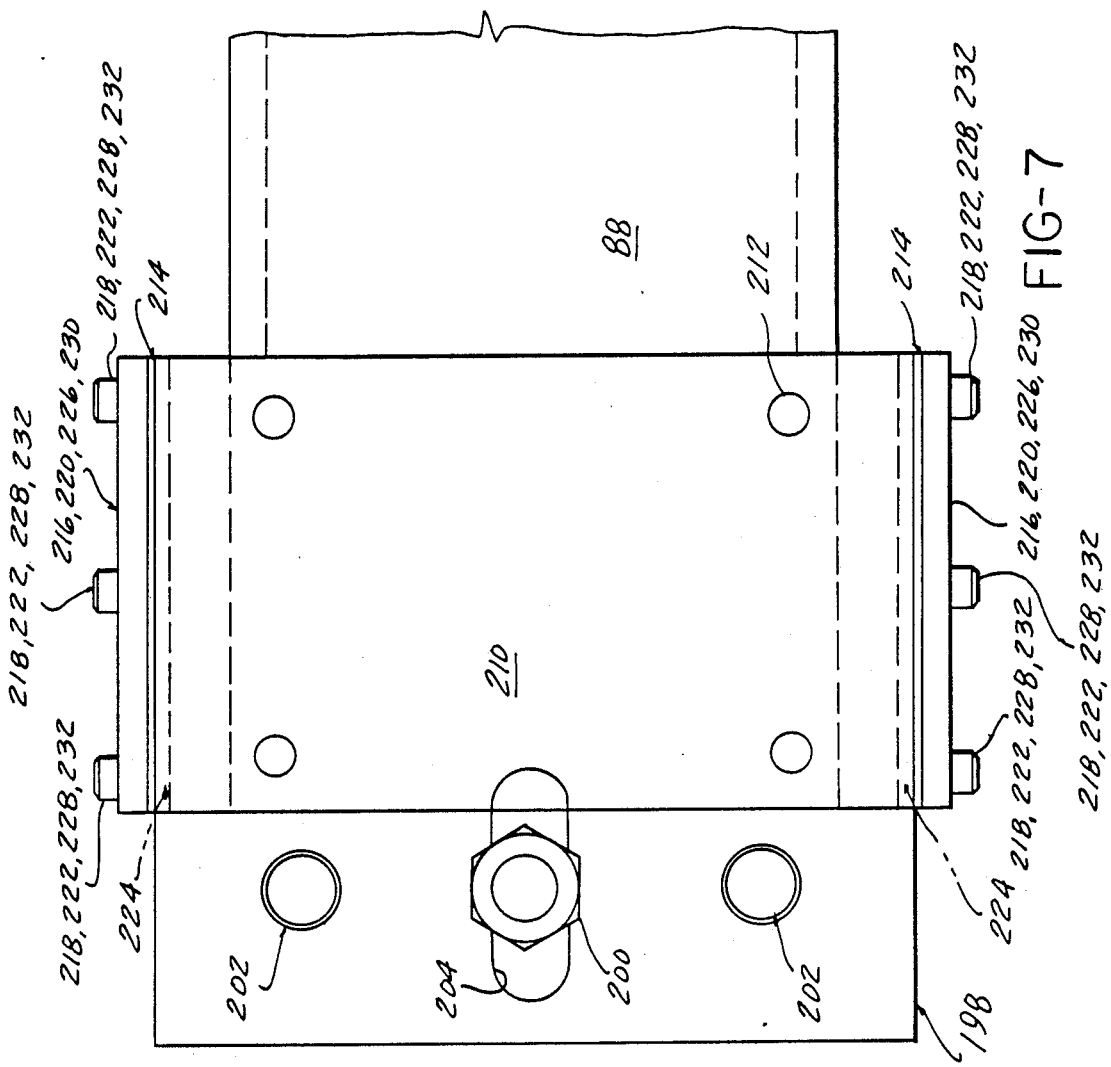

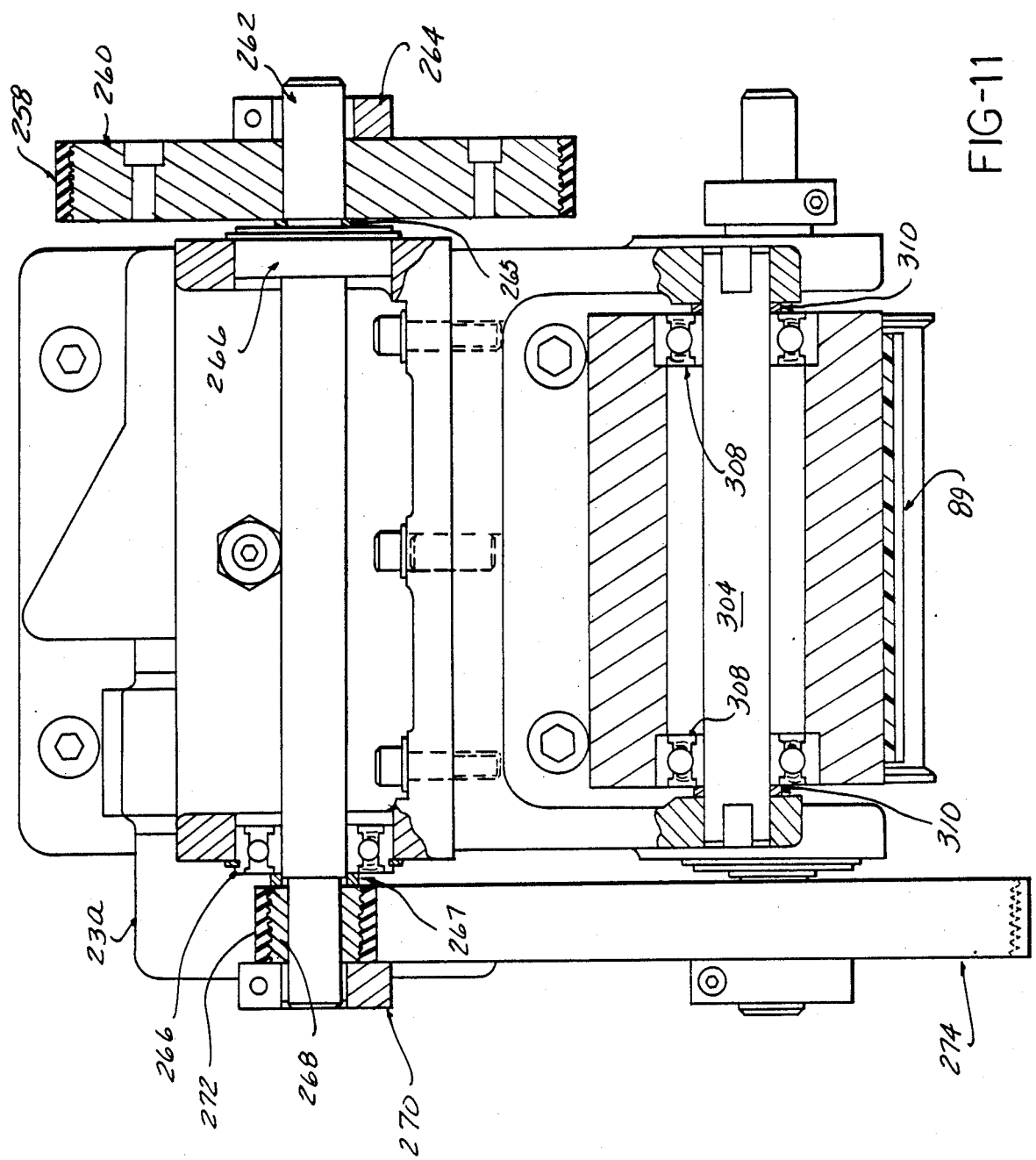

COORDINATE MEASURING MACHINE WITH IMPROVED CARRIAGE DRIVE SYSTEM

This invention concerns coordinate measuring machines of the type in which a measuring probe is supported on carriages moving along precision ways for precisely controlled and measured movement along axes orthogonal to each other. This movement to is over a work piece supporting table so that as the probe tip traverses points on the workpiece, accurate measurement of the distance between the points may be achieved.

An example of a vertical probe coordinate measuring machine is described in U.S. Pat. No. 4,610,089 issued on September 9, 1986 to Bell et al on a "Bridge Type Coordinate Measuring Machine"; and, an example of a horizontal arm machine is described in U.S. Pat. No. 4,305,207 issued on December 15, 1981 to Lantz on a "Three Axis Inspection Machine".

In these machines, it is critical that non-repeatable distortions of the supporting structures such as the base and carriages be avoided. Such distortions directly cause measurement errors due to a loss of precisely repeatable correspondence between the extent of probe movement and the distance between the points to be measured.

The carriages are sometimes powered in their movement along a respective axis, and if the application of the driving forces is off center, the resulting skewing tendency could introduce non-repeatable distorting forces acting on the carriage.

Conventional mechanical drives for the carriages such as ball screws, rack and pinions are stiff to provide good positioning of the carriage but require maintainence and lubrication to avoid wear.

Closed loop belt or pulley drives tend to introduce a give in the drive system adversely affecting performance, including response time and positioning accuracy.

Any tensioning required in a flexible member could introduce non repeatable distortions of the machine structure, and this could be aggravated by differential thermal growth of the components upon changes in ambient temperature conditions.

SUMMARY OF THE INVENTION

The present invention is a coordinate measuring machine having an improved carriage way drive system. The coordinate measuring machine is of the type having a probe supported on a base by one of a plurality of carriages each supported on ways for linear movement along one of a plurality of orthogonal machines axes, and in which the carriages are powered in their movement. The probe is thereby enabled to be moved about a workpiece to enable measurements to be made in the manner well known to those skilled in the art in which a single length of toothed drive belt is fixed so as to be tightly stretched along ways on which the carriage supported to move and be driven by the improved drive system. Mounted to one end of the carriage is a drive package including a drive pulley held in engagement with toothed drive belt by looping of the belt around a pair of idler pulleys located on either side of the drive pulley. The belt passes behind the drive pulley, and a motor rotating the drive pulley in either direction through a reduction propels the carriage in forward and reverse directions on the ways.

The toothed belt is attached at either end to an elongated rigid spar member, in turn mounted to the machine base to lie along the axis of carriage movement. The spar member is secured at one end to a bracket attached to the base, but allowed to float at the other end to prevent stressing of the base structure by the stretching forces applied to the tooth belt and/or the results of differential thermal growth between the structure.

The toothed belt is clamped at either end to flexures which are very rigid in the lengthwise direction of the spar member, but allow slight tranverse movements of the ends of the belt to accommodate any slight misalignments as the carriage is powered along the ways.

The carriage is supported by vertically opposing sets of air bearings cooperating with spaced apart and parallel on inwardly projecting way members. The air bearings are mounted on spaced apart depending carriage legs which straddle a centered guide way mounted on the base and beneath the carriage.

The spar member and toothed belt are mounted between the carriage legs and atop the guide way to be neatly housed completely enclosed.

The coordinate measuring machine having the improved carriage drive system according to the present invention has the advantage of not requiring the maintainence of mechanical drives while affording a stiffness giving good response and accuracy of the drive system. The installation does not stress the machine structure nor does differential thermal growth between the components occur to avoid the resulting non repeatable errors.

The coordinate measuring machine with the improved carriage drive system has the further advantage of accommodating slight transverse inaccuracies along the path of movement of the carriage while maintaining a good positional response.

The drive system also has the advantage of being compact and housed within the machine so as to be completely enclosed.

DESCRIPTION OF THE DRAWINGS

FIGS. 5A and 5B are fragmentary enlarged elevational views of the toothed belt and spar members together with the end mounting arrangements therefore shown in FIGS. 2–4.

FIG. 7 is an enlarged top plan view of the left hand components shown in FIG. 5.

FIG. 11 is a view of the section 11—11 taken in FIG. 8.

DETAILED DESCRIPTION

In the following detailed description, certain specific terminology will be employed for the sake of clarity and a particular embodiment described but it is to be understood that the same is not intended to be limiting and should not be so construed inasmuch as the invention is capable of taking many forms and variations within the scope of the appended claims.

Figure 1:
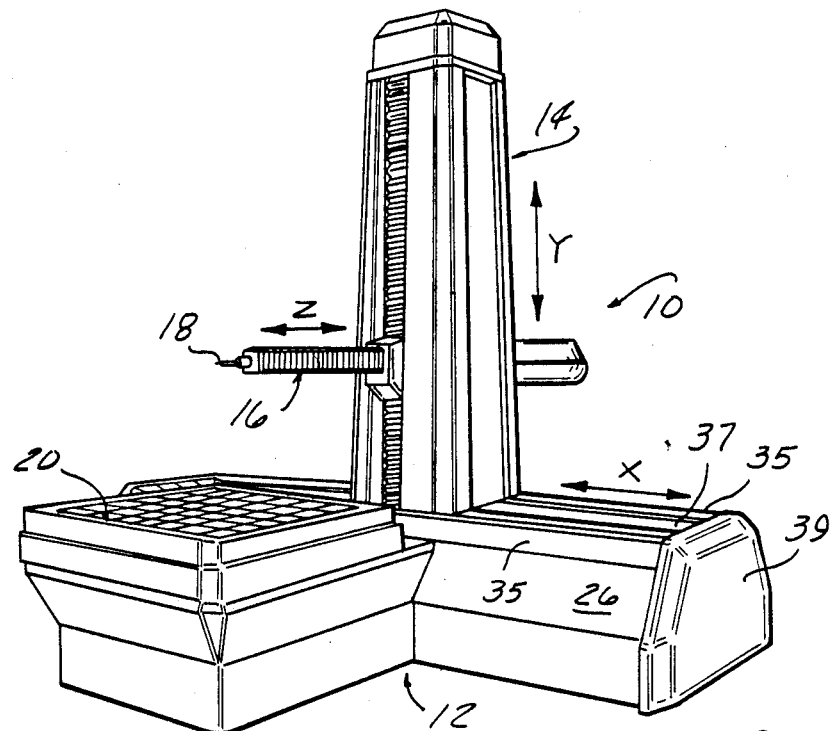
FIG. 1 is a perspective view of a horizontal arm coordinate measuring machine with the improved carriage way arrangement according to the present invention.

FIG. 1 illustrates a horizontal arm type coordinate measuring machine 10, incorporating the improved carriage drive system according to the present invention.

Such coordinate measuring machine 10 includes a tee shaped base 12 on which is supported a vertical column assembly 14 movable thereon along a first horizontal coordinate axis, referred to herein as the X-axis. The vertical column assembly 14 movably supports a horizontal arm 16 having a probe tip 18 affixed thereto, the horizontal arm 16 movable thereon along a vertical, second coordinate axis, referred to herein as the Y-axis. The horizontal arm 16 is also movable horizontally along a third or Z axis parallel to the lengthwise axis of the arm 16, with each of the X, Y, and Z axes orthogonal to each other.

The base 12 also supports a rotary table 20 on which a workpiece to be measured (not shown) may be disposed so as to be accessible by the probe tip 18.

Since such coordinate measuring machines are generally well known, the details are not here described save in connection with the present invention, which involves a carriage drive system applied to the X-axis carriage supporting the vertical column assembly 14.

Figure 2:
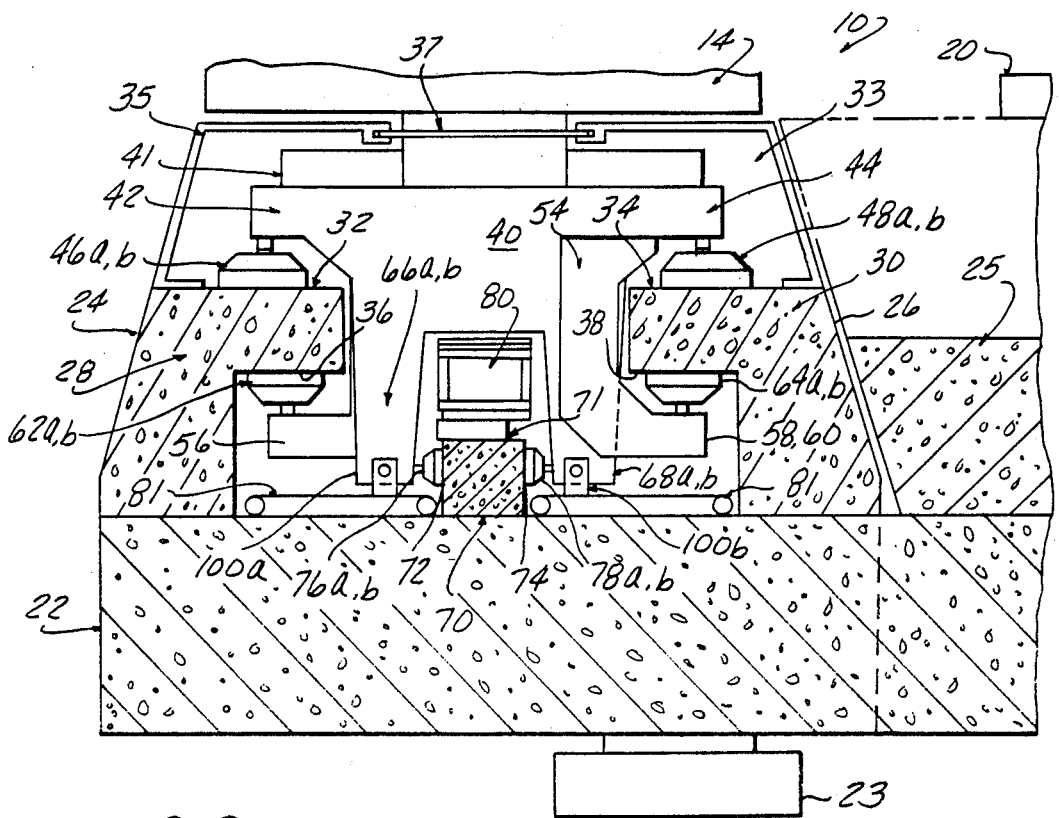
FIG. 2 is a fragmentary side elevational view in partial section of the coordinate measuring machine shown in FIG. 1.

FIG. 2 illustrates details of the way arrangement which includes the base 12, preferably constructed of a granite slab 22 supported on pneumatic isolators 23. Detachably mounted to the base 12, as by bolts (not shown) are a pair of spaced apart upstanding way members 24, 26, each elongated and extending parallel to each other along the X-axis. The way members 24, 26 are each angled inwardly along the upper ends and have opposing overhang portions 28, 30. The top surface of overhang portions 28, 30 are machine to provide accurate upper horizontal way surfaces 32, 34, while the lower opposite surfaces provide undersurface horizontal ways 36, 38 directly beneath the upper way surfaces 32, 34.

An X-axis carriage 40 supports the column assembly 14, attached by a mounting plate 41, and enables linear movement along the X-axis. The carriage 40 is disposed in the space between the angled way members 24, 26. The X-axis carriage 40 is comprised of a machined aluminum casting having integral first portions comprised of outwardly extending wing flanges 42, 44 each overlying a respective one of the upper horizontal ways 32, 34.

An angled cover plate 35 is attached atop each way member 24, 26, and together with a movable dust belt 37 and end caps 39 completely enclose the interior space 33.

Interposed between the flanges 42, 44 and the ways 32, 34, are pairs of support air bearings, rear 46a,b and front 48a, b each bearing in the pairs spaced apart from each other on the X axis carriage 40 in the direction of the X-axis.

The X-axis carriage 40 is formed with second portions comprising a rear bearing support bracket 50, and right and left front bearing support brackets 52 and 54, extending down from the bottom of the X axis carriage 40 into the space between the way members 28, 30, each bracket 50, 52, 54 having end portions 56, 58, 60 respectively extending outwardly beneath the undersurface horizontal ways 36, 38. Interposed therebetween are pairs of preloading air bearings, rear 62 a,b, and front 64 a,b, each bearing in the pair spaced apart in the direction of the X-axis and located in rough alignment beneath a corresponding support air bearing 46a, or 46b; 48a, or 48b.

The X-axis carriage 40 is also formed with integral third portions comprised of a pairs of laterally spaced guide bearing legs 66 a,b; 68 a,b straddling a guide rail 70 attached to the surface of the base 12. The guide rail 70 is preferably also constructed of granite and is of narrow width to minimize the effect of difference in thermal growth from the aluminum X axis carriage 40. A steel transducer grating spar 71 is attached to the top of the guide rail 70 in a manner so as to allow relative thermal expansion therebetween, such as by a pin and slot connection (not shown).

Either side of the guide rail 70 is formed with a vertically extending guide surface 72, 74, parallel to the X-axis. Pairs of guide air bearings 76a, b, 78a,b, are interposed between each of the guide bearing legs 66, 68 and a respective guide surface 72, 74.

The guide bearing pairs 76a,b, 78a,b are likewise spaced apart in the direction of the X-axis.

The granite slab 22 extends beneath a granite spacer block 25 bonded thereto and supporting the rotary work table 20.

The X-axis carriage drive system according to the present invention includes an assembly 80 of a rigid spar member and flexible toothed belt extending along the X-axis and passing through the central space between the brackets 50, 52, 54, and legs 66a,b and 68a,b.

Respective wires for motor power control, transducer signal leads, etc., are formed into cables 81, which are looped in the spaces above the slab 22 and within the way members 24, 26, attached to move easily back and forth with the carriage 40.

Figure 3:
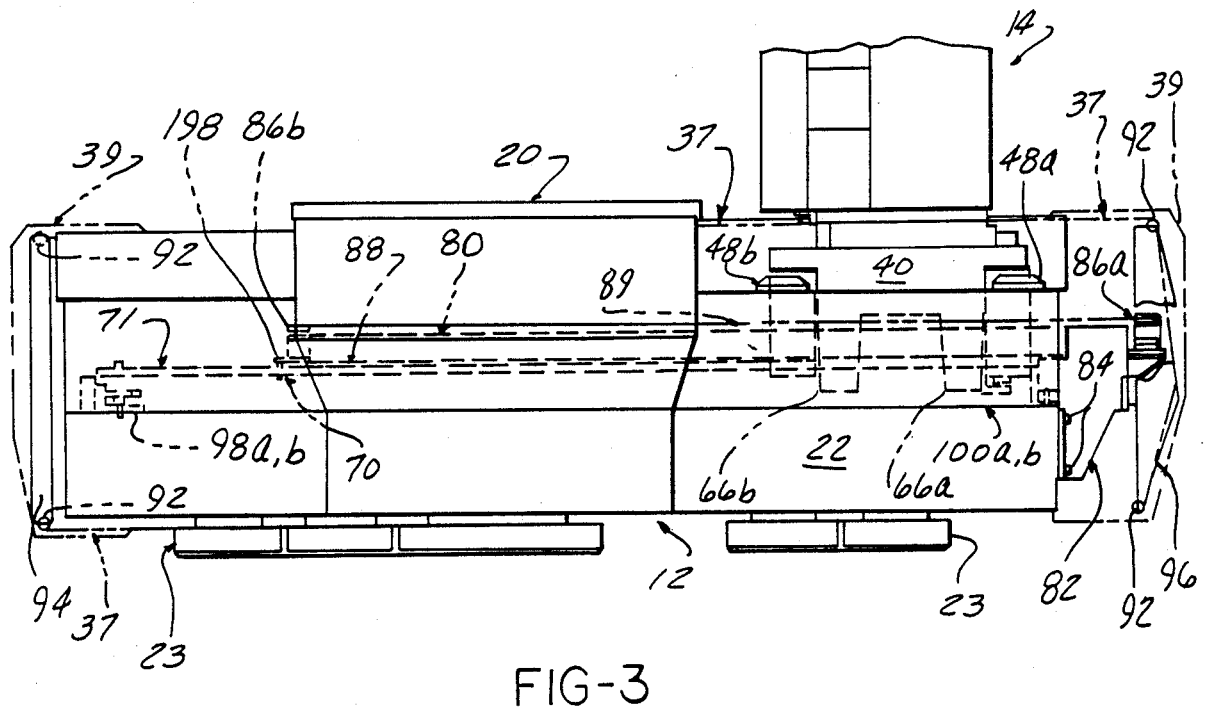
FIG. 3 is a fragmentary front elevational view of the coordinate measuring machine shown in FIGS. 1 and 2.

FIG. 3 illustrates that the spar and belt assembly 80 includes an elongated rigid open member affixed at one end to bracket 82, in turn fixed to one end of the base slab 22 with bolts 84. The rigid spar member 88 is supported at its opposite end from the bracket 82 with a pin and slotted bracket 198 providing stability while not exerting stress on the rail 70 because of the compression load exerted by tensioning of the belt 89 allowing free thermal growth lengthwise in the direction of the X-axis. Both ends of a flexible toothed belt 89 are attached to the spar member 88 via flexures 86a and 86b thus according allowing minor lateral movement of the belt due to misalignment without exerting significant side loads to bearings 76a,b and 78a,b.

The rigid spar 88 absorbs the load exerted by tensioning of the fixed toothed drive belt 89 also included in the carriage drive assembly 80 to thereby avoid imposing distorting error causing loads on the machine structure itself.

The dust belt 37 is recirculated beneath the slab 22 by a series of rollers 92 supported on brackets 94, 96 at either end of the slab 22, housed within the end caps 39. Pairs of bumper pin stop assemblies 98a,b, 100a,b located at either end of the slab 22 centered on either side of the guide rail 70, engaged by respective leg portions 66a, b and 68a, b, to cushion the shock, and to minimize the load applied to the bearings 76a,b; 78a,b.

Figure 4:
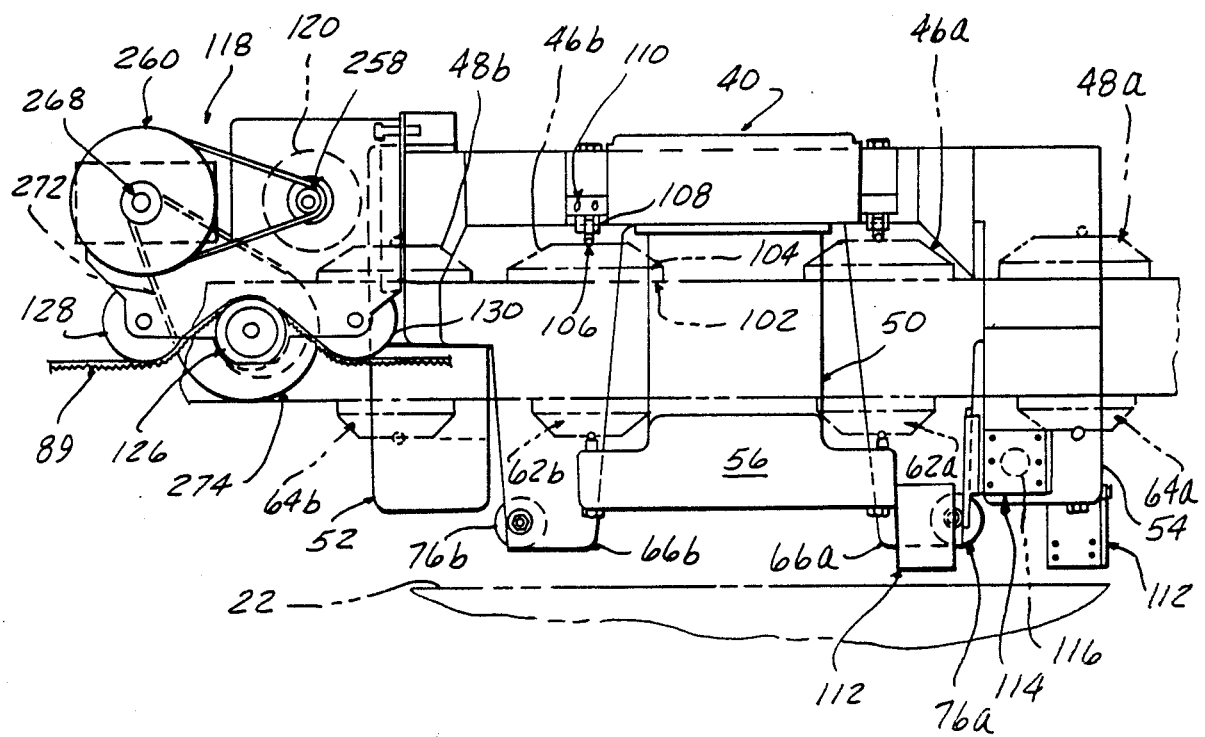
FIG. 4 is an enlarged rear elevational view of the carriage and adjoining structure shown in FIGS. 2 and 3.

FIG. 4 shows that the bottom portion 56 of the rear bracket 50 is relatively wide and supports both rear air preloading bearings 62a, b which are relatively closely spaced, as are the rear support air bearings 46a, b in comparision to the front preload and support bearings 64a, b and 48a, b. This approximates a three point support of the carriage 40 on the ways 32, 34, 36, 38 to lessen the requirement for precise parallelism therebetween.

Each of the air bearings is of a well known design utilized in coordinate measuring machine commercially marketed heretofore. These include a porous bearing pad 102 as of graphite carried by a bearing cap 104 having an internal space supplied with compressed air by plumbing connections (not shown), which air flows out through the porous bearing pad 102 to create an air film providing a bearing support in the well known manner. The cap 104 is supported on a ball 106 received in a conical seat in an adjustable position pin 108 fixed by a clamping bar 110. This arrangement allows slight tilting of the bearing cap 104 and pad 102 to accommodate slight variations in the surface of the way. The air film gap is adjusted by adjusting the position of the pin 108.

Cable holder brackets 112 are attached to the left end of the left hand front preload bearing brackets 54 and the left end of the rear bearing support bracket 50 to which an attached one end of the cables loops 81.

A grating transducer mounting bracket 114 secures the reading head 116 to the left rear guide bearing leg 66a in proper position to scan the grating attached to the grating spar 71.

The carriage drive includes a motor-pulley drive package 118 attached to the left hand end of the carriage as viewed in FIG. 4, including a drive motor 120 and reduction pulleys 260, 274, 254, 268 driving a toothed pulley 126 around which the fixed tooth drive belt 89 is guided by idlers 128, 130. Rotation of the toothed pulley 126 in either direction thus causes linear advance of the X-axis carriage 40 in either direction along the X-axis.

Figure 5A:
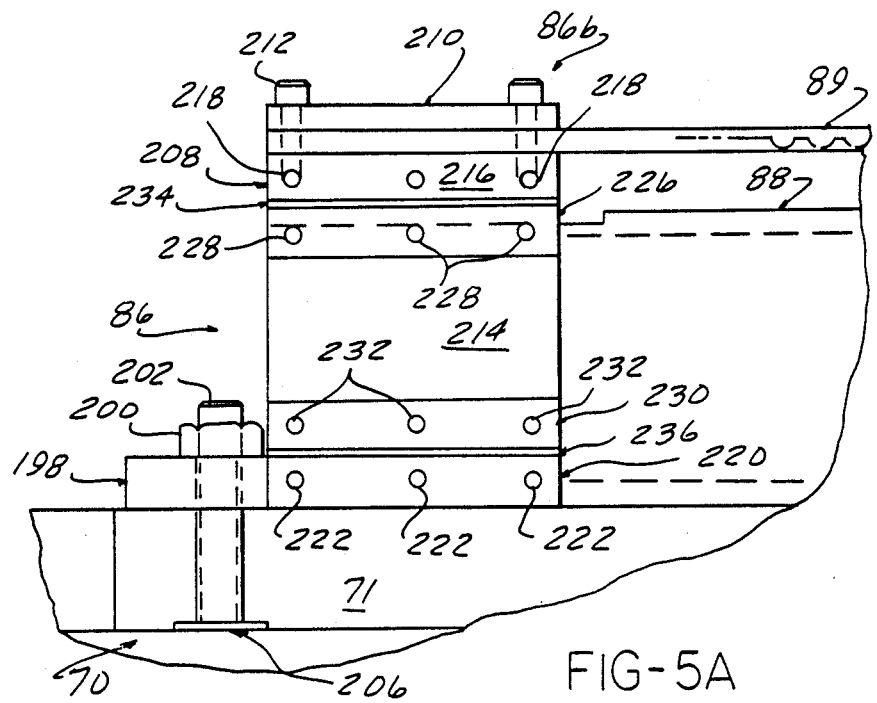

FIGS. 5A and 5B illustrate in further detail the flexures 86a, 86b and the rigid spar member 88. The rigid spar member 88 is a hollow box beam welded to a right angle bracket 152, which in turn is secured to a inside face of bracket 82 by capscrews 154. The flexure assembly 86a includes an anchor bracket 156 fixed to a mounting flange 158 by a series of capscrews 160 passing through a slot 161.

An adjusting bolt 164 is threadably received in a central web 166 integral with the bracket 156 and having an end face 168 engaging a pocket seat 170 machined into the opposite face of the bracket 82. The toothed belt 89 may be tensioned by adjustment of adjusting bolt 164 to move the bracket 156 rightward, tightening of head 165 therof and capscrews 160 holding an adjusted position thereof. The setscrews 162 are used to define the tensioned position of bracket 156 so the same belt tension can be repeated if disassembly of spar and belt assembly 80 is required in the field.

The toothed belt 89 is clamped beneath an upper plate 172 by capscrews 174 received in a lower plate 176, each disposed horizontally with a space therebetween occupied by one end of the toothed belt 89.

The lower plate 176 in turn is connected to the bracket 156 by a pair of thin flexure sheets of spring steel 178 extending edgewise parallel to the X-axis and the toothed belt 89.

Each flexure sheet is clampled along its upper edge by a clamping bar 180 and capscrews 182 received in the opposite sides of the plate 176.

The lower edge is clamped to the anchor bracket 156 by clamping bars 184 and capscrew 186 received in the opposite sides of the bracket 156.

Figure 6:
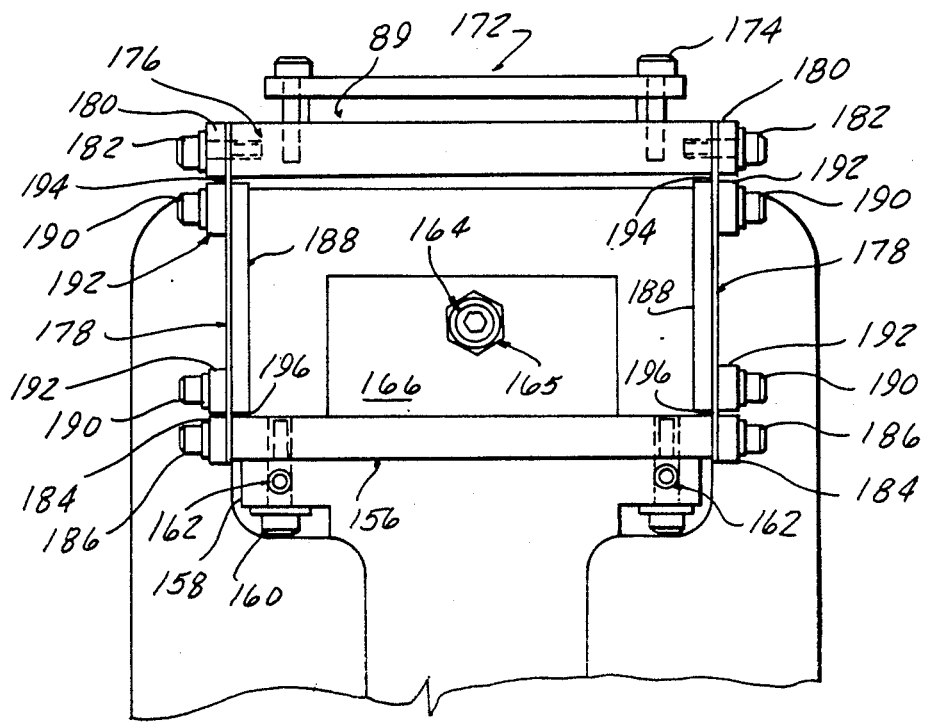
FIG. 6 is an enlarged fragmentary elevational end view of right hand components shown in FIG. 5.
Figure 8:
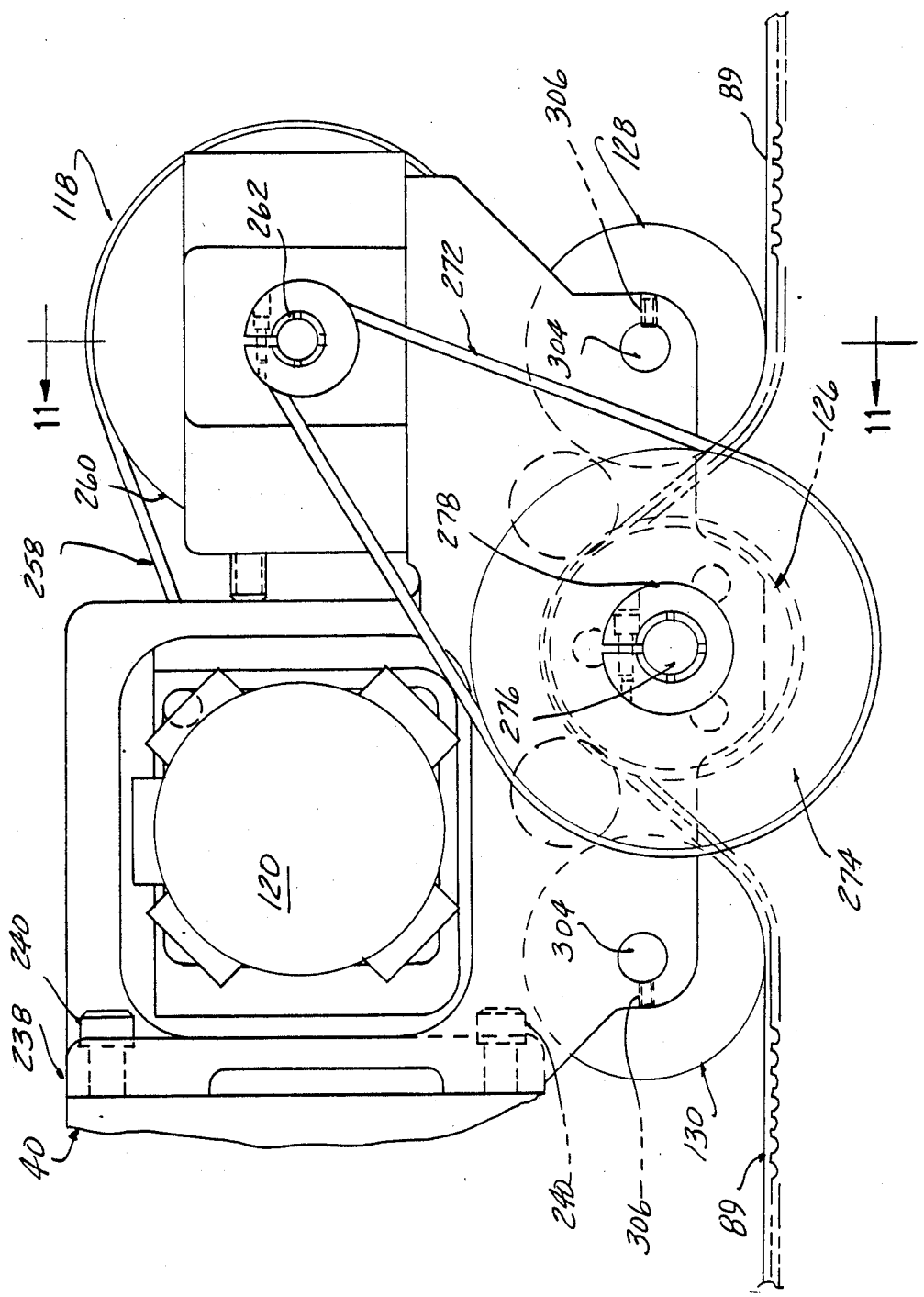
FIG. 8 is an enlarged reverse elevational view of the carriage drive package components shown in FIG. 4.
Figure 9:
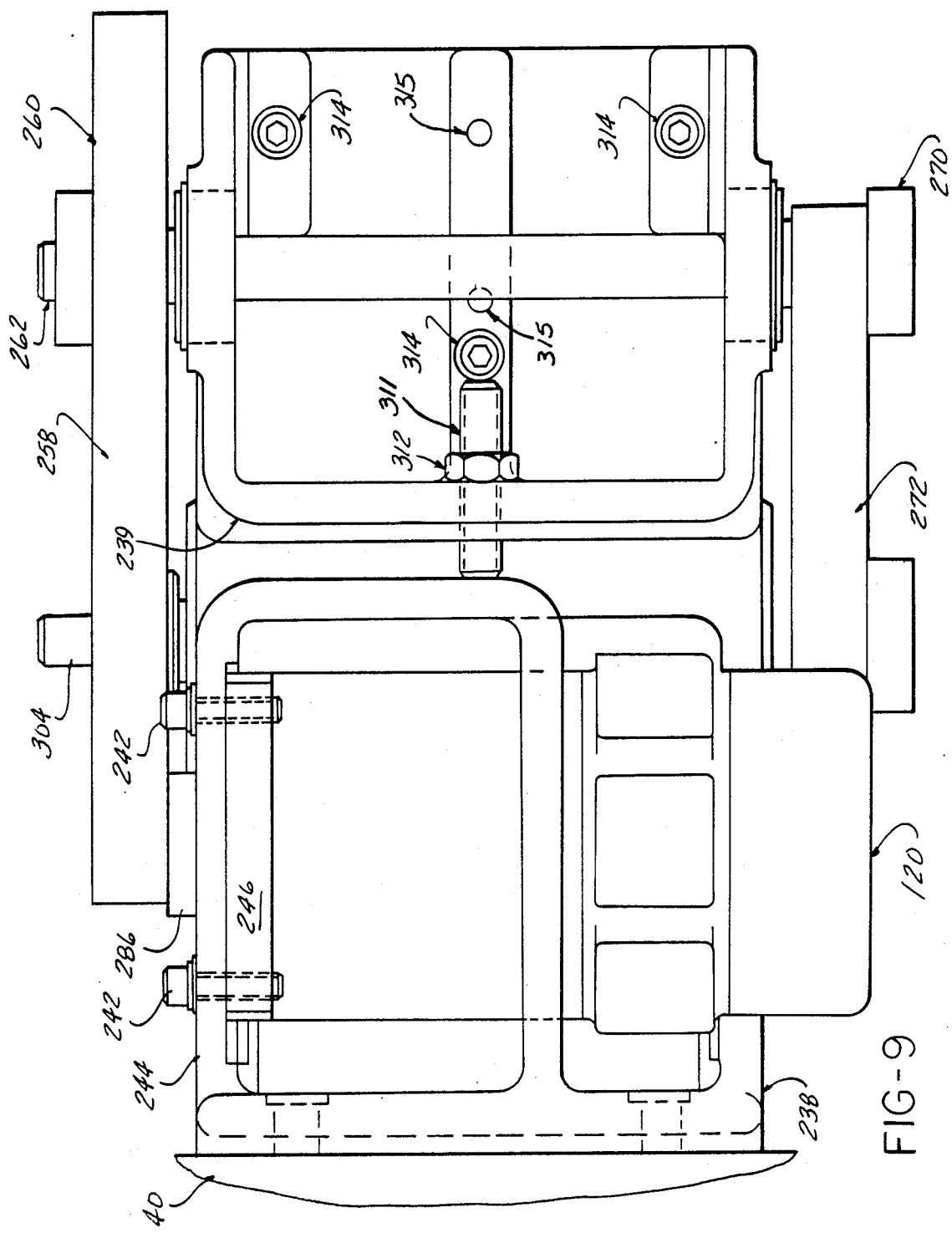
FIG. 9 is a top view of the carriage drive package components shown in FIG. 8.
Figure 10:
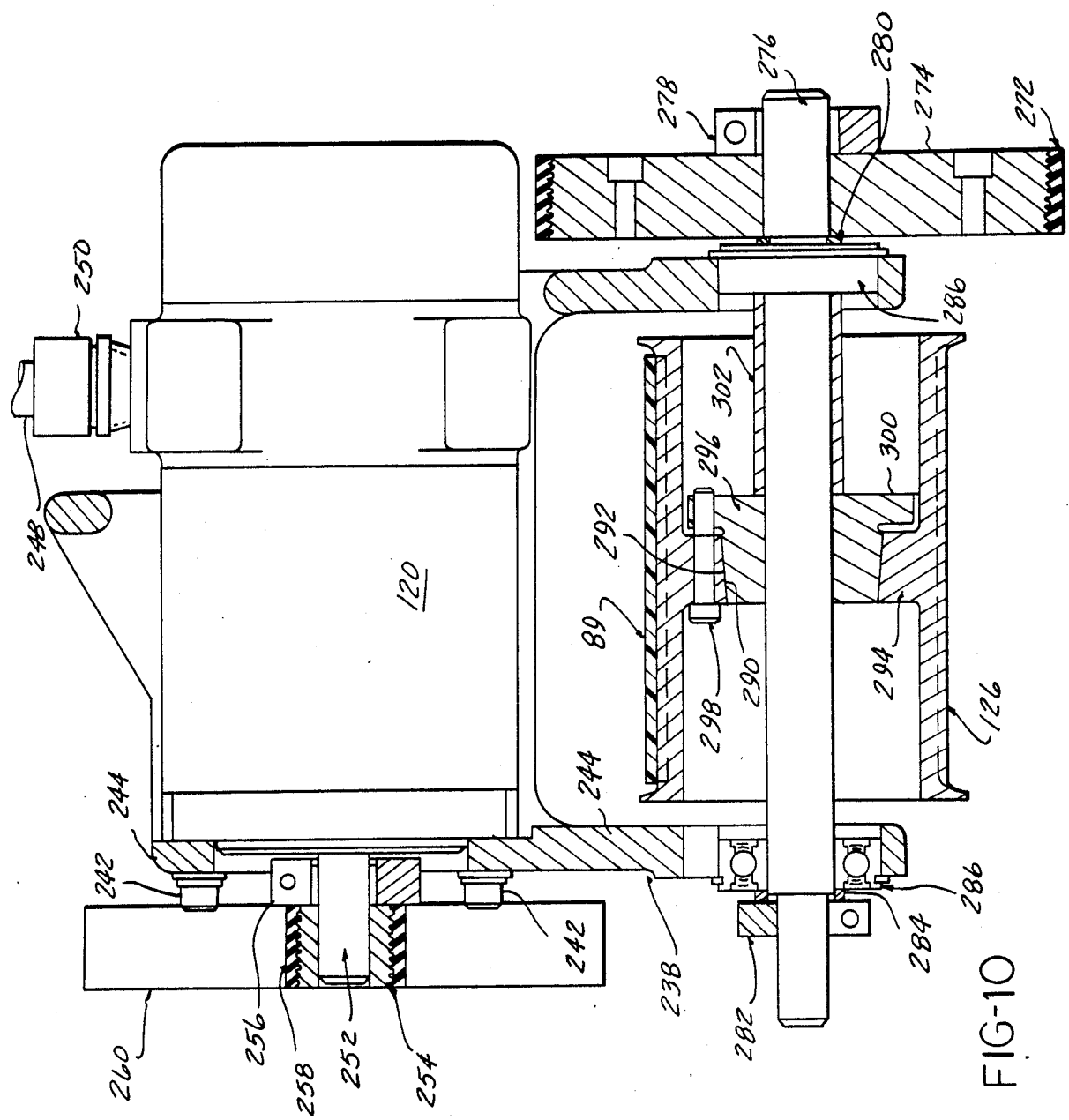
FIG. 10 is a sectional view of the carriage drive package shown in FIG. 8.

FIG. 6 shows that the intermediate region of each flexure sheet 178 is stiffened by a plate 188 secured thereto by capscrews 190 and clamping bars 192. Thus, only narrow upper and lower sections 194 and 196 are unsupported and allowed to flex transversely to the toothed belt 89. The flexure sheets 178, being edgewise oriented along the direction of the X-axis, are extremely rigid to absorb the tension of the toothed belt 89 and transmit that tension into the bracket 82.

Referring to FIGS. 5A and 7, the opposite end of the spar member 88 is welded to an anchor plate 198 located above grating spar 71 with a bolt 200 and a pair of set screws 202 to properly transversely locate and elevate the same. The bolt 200 passes through a slot (shown in FIG. 7) and the set screws 202 rest atop shim pieces 206 on the rail 70 so as to not restrain the left hand end of the spar member 88 lengthwise with respect to the base structure. This precludes transmitting the compressive loads exerted by the belt tension into the rest of the machine, and precludes generation of any thermal stresses tending to distort the machine structure.

The toothed belt 89 is clamped to an upper plate 208 by a clamping plate 210 and capscrews 212.

The upper plate 208 is connected to the base plate 198 by a pair of thin flexure sheets 214 edgewise oriented and parallel to the X-axis direction. Each flexure sheet has its top edge clamped to one side of the upper plate 208 by clamping bars 216 and capscrews 218 received in the side of upper plate 208.

The lower edge of each flexure sheet 214 is clamped to a side of the base plate 198 by clamping bars 220 and capscrews 222.

The intermediate section of each flexure sheet 214 is stiffened by a backing plate 224 clamped thereto by an upper clamping bar 226 and capscrews 228 and a lower clamping bar 230 and capscrews 232. Slight unsupported sections 234 and 236 are left to allow transverse flexing of the flexure sheets 214. At the same time the braced flexure sheets 214 edgewise to the tension exerted by the toothed belt 89 are extremely rigid in that direction.

This arrangement allows slight transverse self aligning movements of the belt 89 to occur precluding any tendency for sidewise loading of the X-axis carriage 40 as the carriage is driven due to any misalignments.

FIGS. 8-11 show further details of the X-axis drive package 118, including a housing 238 secured to one side of the X-axis carriage 40 by capscrews 240. The drive motor 120 is secured to the housing 238 by capscrews 242 passed through web 244 in received in a mounting end plate 246 of the motor 120. A suitable power cable 248 forming a part of cable loops 81 is connected by fitting 250 to the motor 120.

The motor 120 has an output shaft 252 having a pulley sheave 254 attached thereto with a clamping coller 256. A grooved drive belt 258 transmits rotary power to a large diameter pulley sheave 260 secured to one end of a rotary shaft 262 by a split collar 264, a snap retainer 265 maintaining endwise location thereof. Shaft 262 is rotatably supported in a housing bracket 239 by bearings 266 at either end thereof, spacer 267 and maintaining an endwise clearance with a small diameter pulley sheave 268 is attached to the end of the shaft 262 opposite the large diameter sheave 260 by a split collar 270. A second grooved drive belt 272 transmits rotary power from the small diameter pulley sheave 268 to a second large diameter pulley sheave 274 so as to establish a second stage of reduction.

The second large diameter sheave 274 is attached to a rotary shaft 276 with a split clamping coller 278, snap retainer 280 maintaining endwise location with respect to rotary bearing 286 installed in the housing 238.

A clamping collar 282 and spacer 284 locate the opposite end of shaft 276 with respect to a bearing 286 mounted in the housing 238.

A toothed drive drum 126 is fixed to the shaft 276 by being gripped means of pair of conical surfaces 290, 292, formed on a inwardly extending flange 294 and a collar 296 respectively. Capscrews 298 pass through flange 294 and are threadedly received in a flange 300 of collar 296 so that as the two are drawn together, compression of the collar 296 results to cause tight gripping of the shaft 276. A spacer 302 establishes proper axial location of the toothed drive drum 126.

The belt 89 passes around idler drums 128, 130 and engages the toothed drive drum 126.

The idler drums 128, 130 are mounted on stationary shafts 304 fixed in housing 238 by set screws 306. Bearings 308 rotatably support each idler drum 128, 130 on a respective shaft 304, with spacers 310 maintaining axial clearance with adjacent portions of the housing 238.

The housing bracket 239 supporting the shaft 262 is adjustably mounted on the housing 238 to enable tension adjustment of the belts. Adjustment is carried out by an adjusting bolt 311 and nut 312, with capscrews 314 securing the bracket 239 in position on the housing 238 in each adjusted position. The dowel pins 315 are used to keep bracket 239 in line during tensioning with adjusting bolt 311 and nut 312.

I claim:

1. In combination with a coordinate measuring machine (10) of the type having an improved carriage drive system, said coordinate measuring machine of the type including a base (12), a probe shaft (16) having a tip (18); mounting means mounting said probe (16) for movement along each of three orthogonal axes (X,Y,Z), said mounting means including: a carriage (40) supporting said probe (16) way surfaces (32, 34) extending along one (X) of said axes, supporting way bearing means (46a, b; 48a, b) and guide bearing means (72,74,76a,b; 78a,b) supporting and guiding said carriage (40) on said way surfaces (32, 34) for linear movement along said way surface (32,34), and a drive system for driving said carriage (40) along said one (X) axis, the improvement, wherein the drive for said carriage system comprises a drive system for said carriage (40) comprising:

an elongated rigid spar member (88), and means (198, 152) mounting said spar member (88) relative to said base (12) to extend along said one (X) axis adjacent to said way surfaces (32, 34), comprising a first means (154, 152) fixing one end of said spar member (88) to said base (12) and second means (198, 200, 202) positioning the other end of said spar member (88) laterally and vertically on said base (12) while not restraining said other end in a lengthwise direction whereby tension stress in said flexible belt (89) is not transmitted through said spar member (88) into said machine, nor stress caused by differential thermal expansion;

an elongated flexible belt (89); means (86a, 86b) mounting said flexible belt (89) to be stretched along said one (X) axis, said means (86b) attaching one end of said flexible belt (89) to one end of said spar member (88);

drive means (118) attached to said carriage (40) including a rotary drive member (126) engaging said flexible belt and means (120) for rotating said rotary drive member (126) to cause said carriage (40) to be advanced along said flexible belt (89) and said one (X) axis.

2. The coordinate measuring machine (10) according to claim 1 wherein said means (86a, 86b) mounting said flexible belt (89) comprises a pair of flexures (86a, 86b), at either end thereof each rigid in the direction of said axis but compliant in side wise directions whereby enabling sidewise movment of said flexible belt (89) as said drive member transverses along the length thereof.

3. The coordinate measuring machine (10) according to claim 2 where in each of said flexures (86a, 86b) comprise a pair of flexure sheets (178, 214) mounted vertically parallel to each other and said one (X) axis, said pairs of flange sheets (178, 214) secured to a respective end of said flexible belt (89) with said flexible belt oriented horizontally between said flexure sheets (178, 214).

4. The coordinate measuring machine (10) according to claim 3 wherein each of said flexure sheets (178, 214) is stiffened except for a small upper and lower gap (194, 196, 234, 236) whereby the extent of side flexing is reduced.

5. The coordinate measuring machine (10) according to claim 1 wherein said flexible belt (89) and spar member (88) are disposed centered beneath said carriage (40).

6. The coordinate measuring machine (10) according to claim 5 wherein said carriage (40) includes downwardly depending portions (66a,b; 68a,b) straddling said flexible belt (89) and spar member (88).

7. The coordinate measuring machine (10) according to claim 6 wherein said base (12) includes a center rail (70) and said spar member (88) is attached above said center rail (70).

8. The coordinate measuring machine (10) according to claim 1 wherein said flexible belt (89) is toothed and said rotary drive member is toothed to mate therewith; further including a pair of idler wheels (128, 130) on either side of said drive member (126), said flexible belt passing around each of said idler wheels (128, 130) and over said drive member (126) to be held in mesh therewith.

9. The coordinate measuring machine (10) according to claim 8 wherein said drive package includes a drive motor (120) comprising said means for rotating said drive member, and a double reduction means (254, 258, 260, 268, 272, 274) reducing the drive of said drive motor (120).

10. The coordinate measuring machine (10) according to claim 1 further including tensioning means (164) acting to stretch said flexible belt (89) along the length thereof.

* * * * *